United States Patent
Martin et al.

(10) Patent No.: US 10,631,260 B2
(45) Date of Patent: Apr. 21, 2020

(54) TELECOMMUNICATIONS APPARATUS AND METHODS

(71) Applicant: SONY CORPORATION, Tokyo (JP)

(72) Inventors: Brian Alexander Martin, Basingstoke (GB); Hiromasa Uchiyama, Tokyo (JP); Shinichiro Tsuda, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 67 days.

(21) Appl. No.: 15/775,162

(22) PCT Filed: Oct. 7, 2016

(86) PCT No.: PCT/EP2016/074019
§ 371 (c)(1),
(2) Date: May 10, 2018

(87) PCT Pub. No.: WO2017/080730
PCT Pub. Date: May 18, 2017

(65) Prior Publication Data
US 2018/0332552 A1    Nov. 15, 2018

(30) Foreign Application Priority Data

Nov. 13, 2015  (EP) ..................................... 15194490

(51) Int. Cl.
*H04W 56/00*    (2009.01)
*H04W 76/14*    (2018.01)
(Continued)

(52) U.S. Cl.
CPC ....... *H04W 56/0015* (2013.01); *H04L 5/0048* (2013.01); *H04W 56/002* (2013.01);
(Continued)

(58) Field of Classification Search
CPC .......... H04W 56/0015; H04W 72/048; H04W 68/025; H04W 76/14; H04W 4/60; H04W 56/002; H04L 5/0048
See application file for complete search history.

(56) References Cited

U.S. PATENT DOCUMENTS

| 2016/0165563 A1* | 6/2016 | Jang ...................... H04W 76/14 370/328 |
| 2016/0212594 A1* | 7/2016 | Morita .................. H04W 72/10 |
| 2016/0309306 A1 | 10/2016 | Morita et al. |

FOREIGN PATENT DOCUMENTS

| WO | WO 2015/046264 A1 | 4/2015 |
| WO | WO 2015/115974 A1 | 8/2015 |

OTHER PUBLICATIONS

International Search Report dated Dec. 7, 2016 in PCT/EP2016/074019 filed Oct. 7, 2016.
(Continued)

*Primary Examiner* — Kiet Tang
(74) *Attorney, Agent, or Firm* — Xsensus LLP

(57) ABSTRACT

A wireless telecommunications system including first and second terminal devices operable to communicate with one another in a synchronized device-to-device manner. The second terminal device is operable to selectively achieve synchronization for receiving data transmissions from the first terminal device using direct synchronization signalling transmitted by the first terminal device or indirect synchronization signalling transmitted by another network entity, such as a base station. The second terminal device is configured to preferentially seek indirect synchronization over direct synchronization, unless the second terminal device detects synchronization signalling transmitted by the first terminal device is associated with a predefined characteristic that indicates the synchronization signalling transmitted by the first terminal device is high priority synchro- (Continued)

nization signalling, in which case the second terminal device is configured to preferentially seek synchronization using the high priority direct synchronization signalling from the first terminal device over indirect synchronization signalling transmitted by the other network entity.

21 Claims, 4 Drawing Sheets

(51) Int. Cl.
    *H04W 72/00*     (2009.01)
    *H04L 5/00*     (2006.01)
    *H04W 68/02*     (2009.01)
    *H04W 72/04*     (2009.01)
    *H04W 4/60*     (2018.01)

(52) U.S. Cl.
    CPC ....... *H04W 68/025* (2013.01); *H04W 72/048* (2013.01); *H04W 76/14* (2018.02); *H04W 4/60* (2018.02)

(56) References Cited

OTHER PUBLICATIONS

"Guidelines for evaluation of radio interface technologies for IMT-Advanced," Report ITU-R M.2135, Retrieved from the Internet: [http://www.itu.int/pub/R-REP-M.2135-2008/en], 2008, pp. 1-67.

Qualcomm Incorporated, "Study on LTE Device to Device Proximity Services," 3GPP TSG RAN Meeting #58 RP-122009, Last updated Mar. 14, 2014, 6 Pages.

Qualcomm Incorporated, "Work item proposal on LTE Device to Device Proximity Services," 3GPP TSG RAN Meeting #63 RP-140518, Mar. 2014, 7 Pages.

Qualcomm Incorporated, "Work Item Proposal for Enhanced LTE Device to Device Proximity Services," 3GPP TSG RAN Meeting #66 RP-142229, Dec. 2014, 8 Pages.

LG Electronics, et al., "New SI proposal: Feasibility Study on LTE-based V2X Services," 3GPP TSG RAN Meeting #68 RP-151109, Jun. 2015, 7 Pages.

"3rd Generation Partnership Project; Technical Specification Group Radio Access Network; Study on LTE Device to Device Proximity Services; Radio Aspects (Release 12)," 3GPP TR 36.843 V12.0.1, Mar. 2014, pp. 1-50.

"Report from CEPT to EC in response to the Mandate on the harmonised radio spectrum use for safety critical applications of Intelligent Transport Systems (ITS) in the European Union," CEPT Report 20, Electronic Communications Committee (ECC), Dec. 21, 2007, 42 Pages.

Harri Holma, et al., "LTE for UMTS OFDMA and SC-FDMA Based Radio Access" John Wiley & Sons, Ltd., 2009, 8 Pages.

"3rd Generation Partnership Project; Technical Specification Group Radio Access Network; Evolved Universal Terrestrial Radio Access (E-UTRA); Radio Resource Control (RRC); Protocol specification (Release 12)" 3GPP TS 36.331 V12.7.0, Sep. 2015, pp. 1-453.

* cited by examiner

TELECOMMUNICATIONS APPARATUS AND METHODS

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) and Long Term Evolution Advanced (LTE-A) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth and higher generation networks is therefore strong and the coverage area of these networks, i.e. geographic locations where access to the networks is possible, is expected to increase rapidly. However, although the coverage and capacity of fourth and higher generation networks may significantly exceed those of previous generations of communications networks, there are still limitations on network capacity and the geographical areas that can be served by such networks. These limitations may, for example, be particularly relevant in situations in which there is a desire for a group of terminal devices (communications devices) to exchange information with each other in a fast and reliable manner. In order to help address these limitations there have been proposed approaches in which terminal devices within a wireless telecommunications system may be configured to communicate data directly with one another without some or all their communications passing through an infrastructure equipment element, such as a base station. Such communications are commonly referred to generally as a device-to-device (D2D) communications or proximity services (Prose). Many device-to-device communications may be transmitted by one device to a plurality of other devices in a broadcast like manner and so in that sense the phrase "device-to-device communications" also includes "device-to-devices communications".

Thus, D2D communications allow communications devices that are in sufficiently close proximity to directly communicate with each other, both when within the coverage area of a network and when outside a network's coverage area (e.g. due to geographic restrictions on a network's extent or because the network has failed or is in effect unavailable to a terminal device because the network is overloaded). D2D communications can allow user data to be more efficiently and quickly communicated between communications devices by obviating the need for user data to be relayed by a network entity such as a base station. D2D communications also allow communications devices to communicate with one another even when one or both devices may not be within the reliable coverage area of a network. The ability for communications devices to operate both inside and outside of coverage areas makes wireless telecommunications systems that incorporate D2D capabilities well suited to applications such as public protection/safety and disaster relief (PPDR), for example. PPDR related communications may benefit from a high degree of robustness whereby devices can continue to communicate with one another in congested networks and when outside a coverage area. 3GPP has developed some proposals for such public safety D2D use in LTE networks in Release12.

The automotive industry has been working for several years on solutions to enable communication with and between vehicles, e.g. to help improve traffic flow and safety. These techniques can range from automatic tolling technologies to collision prevention mechanisms, and are generally known as Intelligent Transport Systems (ITS). Currently, the main radio technology under consideration in standards projects relating to ITS is a WLAN derivative 802.11p, which would be used for broadcasting ITS information by vehicles or road side infrastructure to other vehicles. This constitutes so-called Dedicated Short Range Communication (DSRC) system that is deployed at 5.9 GHz ITS band in Europe and North America (there may be different ITS bands in use in other regions, e.g. 700 MHz in Japan).

The effective range of DSRC systems is a few hundred meters and the services are broadcast oriented (emergency vehicle notices, for example).

However, there have also been proposals for communications based on those used in mobile telecommunications systems, such as Long Term Evolution (LTE) based networks operating on International Mobile Telecommunications (IMT) bands, to help support ITS applications, for example to provide more capacity and potentially provide for wider and cheaper coverage. In particular, where the existing cellular network already covers roadways the capital expenditure costs associated with using cellular mobile telecommunications techniques for ITS applications may be significantly less than what would be needed for setting up a new DSRC-based ITS network.

Accordingly, an Intelligent Transport System may rely on D2D communications of the kind proposed for mobile wireless telecommunications systems to allow vehicles to communicate with one another and with other terminal devices or network infrastructure equipment, such as a base station or specific road side infrastructure. In this regard, communications associated with connected vehicle systems may be conveniently referred to as V2X (vehicle-to-everything) communications, which may comprise V2V (vehicle-to-vehicle), V2P (vehicle-to-pedestrian) and V2I (vehicle-to-infrastructure). Infrastructure in this case may be a roadside ITS related infrastructure element, which may be referred to as a road side unit (RSU), or a conventional Internet or mobile network infrastructure element. Some examples or services in connected a vehicle context are Cooperative Awareness Message (CAM) and Decentralised Environmental Notification (DEN). These constitute applications such as allowing emergency vehicles to broadcast their presence and allowing roadside infrastructure to broadcast speed limit information to vehicles.

It has been proposed that V2X communications may be implemented using dedicated Road Side Units (RSUs) which communicate with vehicles and which assign radio resources for use by the vehicles in V2X communications. In particular, such RSUs may allocate D2D radio resources for use in V2X communications. Nonetheless, it is also to be expected that there may be situations where vehicles will wish to autonomously communicate directly with one another (V2V) without any network infrastructure interaction, for example because not all the roadways may have RSUs installed, particularly in more rural areas.

As noted above, one attractive aspect of D2D type communications which may be particularly, but not exclusively, well suited to vehicular applications (i.e. V2V) is the reduction in signalling latency that can be achieved with D2D communications as compared to conventional communications routed via network infrastructure equipment, such as a base station. This can be helpful in a V2V context, for example, if a vehicle wishes to transmit high priority signalling to notify other vehicles of an emergency situation, for example a crash or warning of an emergency services vehicle.

Although D2D type communications can help information to be exchanged between terminal devices more quickly than with more conventional techniques in which data is routed through a base station or other network infrastructure element, the inventors have recognised there still remains a need for new approaches which can still further reduce the time taken to exchange data between terminal devices in a wireless telecommunications system in a device-to-device (e.g. V2X) mode.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
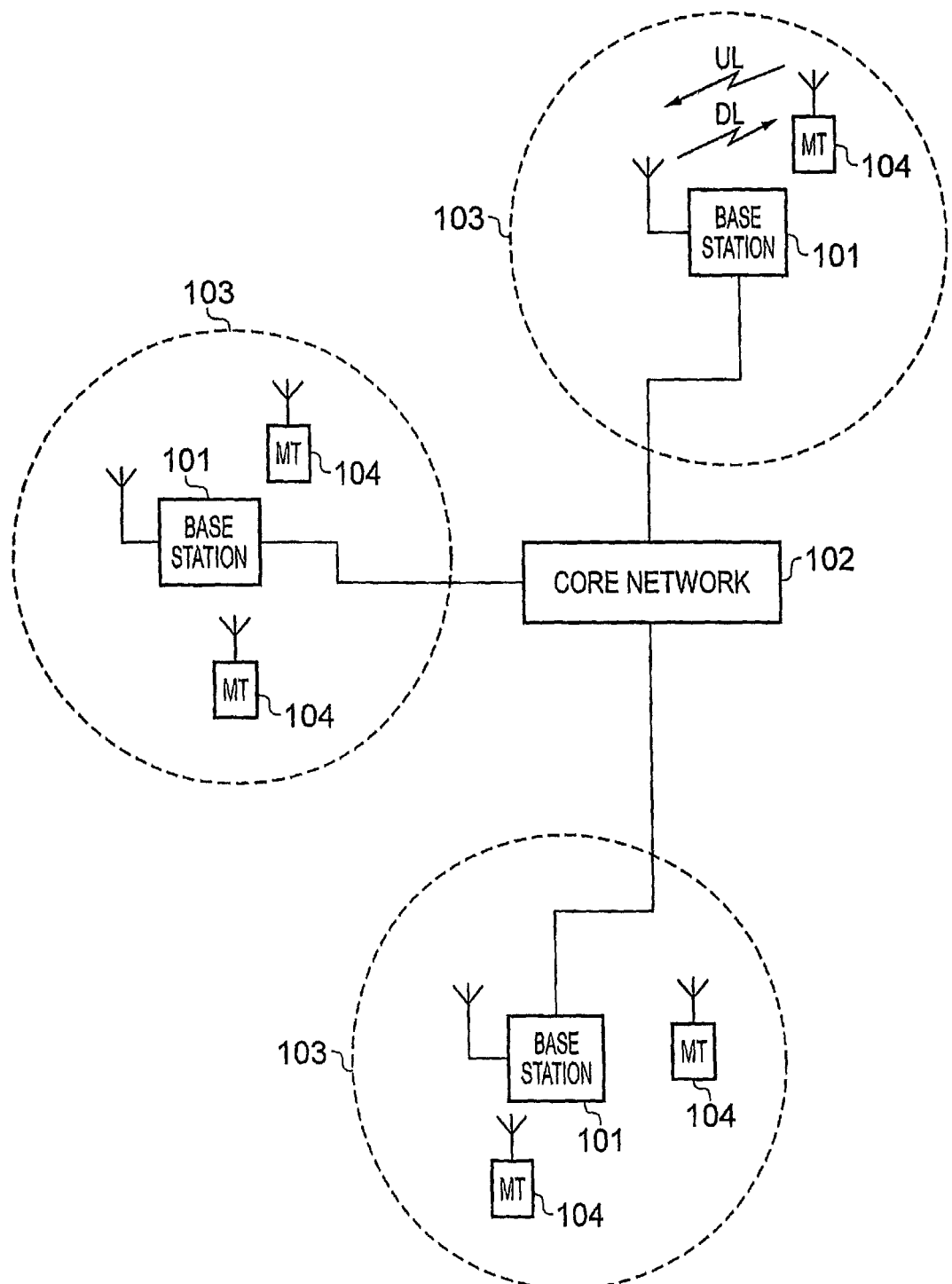
FIG. 1 provides a schematic diagram illustrating an example of a mobile telecommunication system.

FIG. 1 provides a schematic diagram illustrating some basic functionality of a mobile (cellular) telecommunications network/system 100, in this example operating generally in accordance with LTE principles, and which may be adapted to implement embodiments of the disclosure as described further below. Various elements of FIG. 1 and their respective modes of operation are well-known and defined in the relevant standards administered by the 3GPP® body, and also described in many books on the subject, for example, Holma, H. and Toskala, A. [1]. It will be appreciated that operational aspects of the telecommunications network which are not specifically described below may be implemented in accordance with any known techniques, for example according to the relevant standards and known variations thereof. Furthermore, it will be appreciated that whilst some specific examples described herein may refer to implementations based around particular 3GPP implementations, the same principles can be applied regardless of the underlying operating principles of the network. That is to say, the same principles can be applied for wireless telecommunications networks operating in accordance with other standards, whether past, current or yet to be specified.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that may be used by the operator of the network 100. The core network 102 routes data to and from the terminal devices 104 via the respective base stations 101 and provides functions such as authentication, mobility management, charging and so on. In addition to the base stations 101 and terminal devices 104, the system 100 further comprises one or more relay nodes/devices 105. These may be used to enhance coverage for terminal devices operating in the relevant cell(s). The deployment of relay nodes (e.g. in terms of their locations) may follow generally established techniques for using relay nodes to support coverage in wireless telecommunications systems. In terms of terminology, it will be appreciated that terminal devices may also be referred to as mobile stations, user equipment (UE), user terminal, mobile radio, and so forth. Similarly, base stations may also be referred to as transceiver stations/nodeBs/e-nodeBs, and so forth. Furthermore, relay nodes may also be referred to as relay devices/relays, and so forth. In some example implementations of the present disclosure, a terminal device may be operating as a relay node to assist in supporting communications associated with other terminal devices. That is to say, the functionality of a relay device may be provided by a suitably configured terminal device.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

Figure 2:
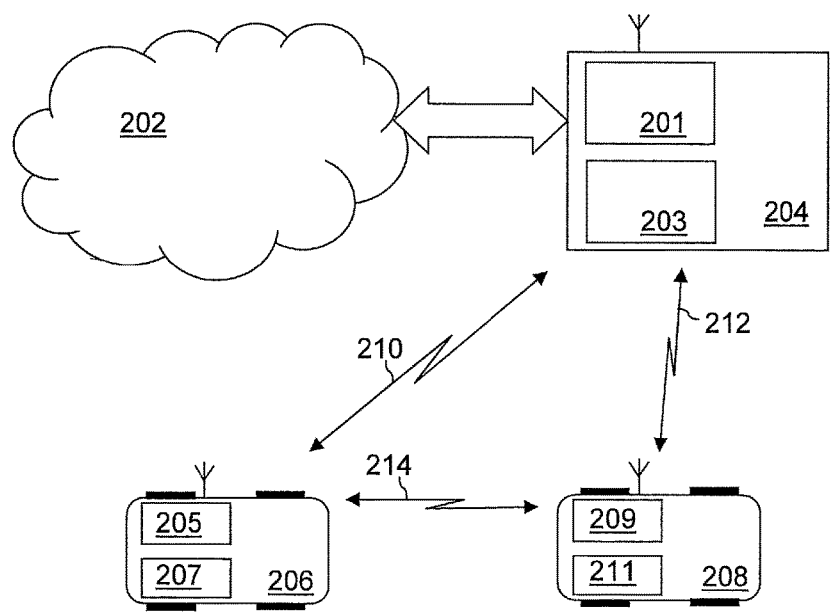
FIG. 2 schematically represents a wireless telecommunications system according to certain embodiments of the disclosure.

FIG. 2 schematically shows a telecommunications system 200 supporting device-to-device communications in accordance with an embodiment of the disclosure. In particular, FIG. 2 represents an operating scenario in the context of an Intelligent Transport System (ITS) scheme whereby vehicles equipped with terminal devices are configured to support device-to-device communications (vehicle-to-vehicle communications) to allow them to communicate with one another to exchange information using the radio resources of the wireless telecommunications system 200. The telecommunications system 200 in this example is based broadly on a LTE-type architecture with modifications to support device-to-device communications (i.e. direct signalling exchange between terminal devices to communicate data between them) generally in accordance with previously proposed schemes for D2D communications. As such many aspects of the operation of the telecommunications system 200 are already known and understood and not described here in detail in the interest of brevity. Operational aspects of the telecommunications system 200 which are not specifically described herein may be implemented in accordance with any known techniques, for example according to the established LTE-standards and known variations and modifications thereof (e.g. to provide/introduce support for D2D communications in a vehicle-to-vehicle/ITS context).

The telecommunications system 200 comprises a core network part (evolved packet core) 202 coupled to a radio network part. The radio network part comprises a base station (evolved-nodeB) 204, a first terminal device 206 and a second terminal device 208. Each terminal device is deployed within a vehicle for providing vehicle-to-vehicle communication functionality. It will of course be appreciated that in practice the radio network part will comprise a plurality of base stations serving a larger number of terminal devices (vehicles) across various communication cells. However, only a single base station and two terminal devices are shown in FIG. 2 in the interests of simplicity for this figure.

As with a conventional mobile radio network, the terminal devices 206, 208 are arranged to communicate data to and from the base station (transceiver station) 204. The base station is in turn communicatively connected to a serving gateway, S-GW, (not shown) in the core network part which is arranged to perform routing and management of mobile communications services to the terminal devices in the telecommunications system 200 via the base station 204. In order to maintain mobility management and connectivity, the core network part 202 also includes a mobility management entity (not shown) which manages the enhanced packet service, EPS, connections with the terminal devices 206, 208 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 202 to an external packet data network, for example the Internet. As noted above, the operation of the various elements of the communications system 200 shown in FIG. 2 may be broadly conventional apart from where modified to provide functionality in accordance with embodiments of the disclosure as discussed herein. It will further be appreciated that for other implementations which are based around wireless telecommunications systems operating in accordance with different standards, the network architecture may be correspondingly different.

The first and second terminal devices 206, 208 are D2D (more specifically, V2V) enabled devices configured to operate in accordance with embodiments of the present disclosure as described herein. The terminal devices 206, 208 each comprise a respective transceiver unit 205, 209 for transmission and reception of wireless signals and a respective controller unit 207, 211 configured to control the respective terminal devices 206, 208. The respective controller units 207, 211 may each comprise a processor unit which is suitably configured/programmed to provide the desired functionality using conventional programming/configuration techniques for equipment in wireless telecommunications systems. The respective transceiver units 205, 209 and controller units 207, 211 are schematically shown in FIG. 2 as separate elements. However, it will be appreciated for each of the terminal devices the functionality of the terminal device's receiver and controller units can be provided in various different ways, for example using a single suitably programmed general purpose computer, or suitably configured application-specific integrated circuit(s)/circuitry. It will be appreciated the first and second terminal devices 206, 208 will in general comprise various other elements associated with their operating functionality in accordance with established wireless telecommunications techniques (e.g. a power source, possibly a user interface, and so forth).

The base station 204 is configured to support communications with the terminal devices and may also in some situations for some examples play a role in configuring aspects of D2D communications between the terminal devices, for example establishing which radio resources may be used for D2D communications between terminal devices operating within the coverage area of the base station 204. The base station 204 comprises a transceiver unit 201 for transmission and reception of wireless signals and a controller unit 203 configured to control the base station 204. The controller unit 203 may comprise a processor unit which is suitably configured/programmed to provide the desired functionality using conventional programming/configuration techniques for equipment in wireless telecommunications systems. The transceiver unit 201 and the controller unit 203 are schematically shown in FIG. 2 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 204 will in general comprise various other elements associated with its operating functionality. For example, the base station 204 will in general comprise a scheduling entity responsible for scheduling communications. The functionality of the scheduling entity may, for example, be subsumed by the controller unit 203.

Thus, the base station 204 is configured to communicate data with the first terminal device 206 over a first radio communication link 210 and communicate data with the second terminal device 208 over a second radio communication link 212 when the respective terminal devices are in coverage of the base station. Both radio links may be supported within a single radio frame structure associated with the base station 204. It is assumed here the base station 204 is configured to communicate with the terminal devices 206, 208 over the respective radio communication links 210, 212 generally in accordance with the established principles of LTE-based communications. Nevertheless, it will be appreciated that some embodiments may be implemented without the respective terminal devices undertaking any base station communications, and in this regard the principles described herein with regards to vehicle-to-vehicle communications may for some implementations be undertaken regardless of whether the respective vehicles (mobile terminals) are in coverage or out of coverage of a base station.

In addition to the terminal devices 206, 208 being arranged to communicate data to and from the base station (transceiver station) 204 over the respective first and second radio communication links 210, 212, the terminal devices 206, 208 are further arranged to communicate with one another (and other terminal devices within the wireless telecommunications system) in a device-to-device (D2D) manner over a D2D radio communication link 214, as schematically indicated in the figure. The underlying principles of the D2D communications supported in the wireless telecommunications system of FIG. 2 may follow any previously proposed techniques, but with modifications to support approaches in accordance with embodiments of the disclosure as described herein.

As is well known, synchronisation is an important aspect of wireless telecommunications. To support reliable communications in a wireless telecommunications system, the entities involved in the communications, i.e. the transmitter and receiver entities, should be appropriately synchronised with one another. Wireless communications are typically undertaken using a radio frame structure comprising grid of radio resources spanning time (e.g. time slots in a subframe) and frequency (e.g. OFDM subcarriers across a system bandwidth). A transmitting entity will undertake transmissions at particular times and on particular frequency resources, e.g. determined in accordance with a scheduling process. The receiving entity needs to be sufficiently well time synchronised to the transmitting entity to allow the receiving entity to properly locate and decode the transmissions on the relevant time and frequency resources.

The process of synchronisation is well understood in terms of how synchronisation may be achieved using synchronisation signalling transmitted by one of the entities. For example, in an LTE-based wireless telecommunications system, terminal devices will typically synchronise to the base station to which they are connected by receiving and processing the primary synchronisation signalling (PSS) and secondary synchronisation signalling (SSS) transmitted by the base station.

Within a cell of a wireless telecommunications system it is typical for the active terminal devices within coverage of a base station serving the cell to be synchronised to the base station. Because of this it is typical for the active terminal devices within network coverage to be synchronised with one another because they are all respectively synchronised to the network. In this regard the base station may in some respects be considered to provide for centralised synchronisation of terminal devices. Thus, a first in-coverage terminal device and a second in coverage terminal device which are to exchange data in a device-to-device manner will typically be synchronised to one another by virtue of both being synchronised to the base station. However, in a wireless telecommunications system supporting device-to-device communications there can arise a situation in which a first terminal device wishes to communicate with a second terminal device in a device-to-device manner, but one or other (or both) of these terminal devices are out of coverage of the base station. This means at least one of the terminal devices will not be able to synchronise to the base station, and so will instead need to achieve synchronisation with the other terminal device through a different mechanism. To address this issue, it is proposed to use what may be referred to as sidelink synchronisation procedures whereby a first terminal device transmits synchronisation signalling to allow a second terminal device to synchronise to the first terminal device. In this regard the underlying process of synchronisation, for example in terms of the nature of the synchronisation signalling, may be performed in accordance with the same principles as for conventional base station synchronisation, the major difference being the synchronisation signalling is transmitted by a terminal device, rather than a base station.

Figure 3:
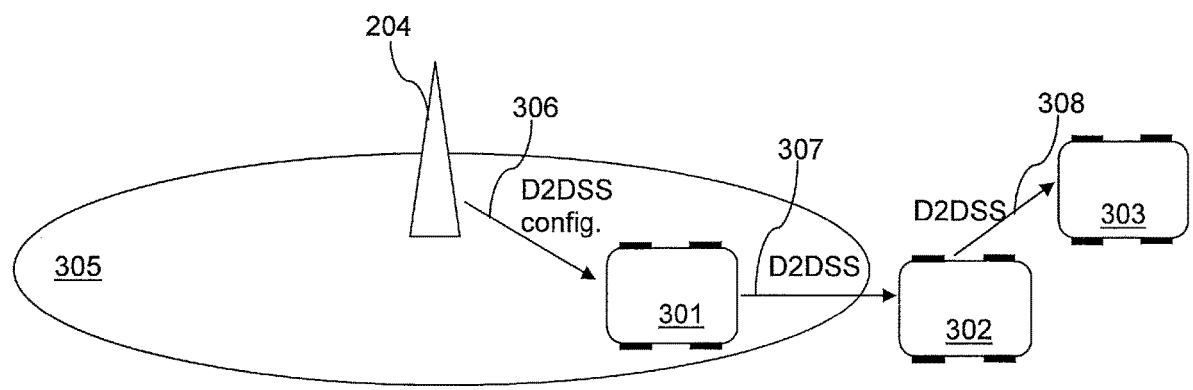
FIG. 3 schematically represents approaches for achieving synchronisation for device-to-device communications.

FIG. 3 illustrates an example of how D2D UEs may achieve synchronisation in accordance with established 3GPP Release 12 D2D proposals. See, for example, ETSI TS 136 331 v12.7.0 (2015-09)/3GPP TS 36.331 version 12.7.0 Release 12 [2] for more details, for example in Section 5.10. FIG. 3 shows a base station 204 (e.g. corresponding to the base station represented in FIG. 2) having a coverage area 305, and a first terminal device 301, a second terminal device 302 and a third terminal device 303 (e.g. such as the terminal devices 206, 208 represented in FIG. 2). It is assumed here the first terminal device 301 is within the coverage area 305 of the base station 204, the second terminal device 302 is outside the coverage area 305 of the base station 204, but within the D2D communication range of the first terminal device 301, and the third terminal device 303 is outside the coverage area 305 of the base station 204 and outside the D2D communication range of the first terminal device 301, but within the D2D communication range of the second terminal device 302.

The first terminal device 301 achieves synchronisation with the base station in the usual way, for example through reception of primary and secondary synchronisation signalling. The first terminal device 301 also receives from the base station configuration settings for D2D synchronisation signalling that the first terminal device 301 may broadcast to help other devices within its D2D communication range to achieve synchronisation (schematically indicated in FIG. 3 by the signalling arrow labelled 306). The first terminal device 301 is thus configured to broadcast D2D synchronisation signalling (D2DSS) in accordance with the configuration settings received from the base station 204 (schematically indicated in FIG. 3 by the signalling arrow labelled 307). The second terminal device 302 cannot receive the primary and secondary synchronisation signalling from the base station, but can receive the D2DSS 307 from the first terminal device 301, which allows the second terminal device 302 to synchronise to the first terminal device 301, which is in turn synchronised to the base station 204. The second terminal device 302 is in turn configured by signalling received from the first terminal device 301 to broadcast D2D synchronisation signalling (D2DSS) in accordance with the configuration settings originally transmitted by the base station 204. The third terminal device 303 cannot receive the primary and secondary synchronisation signalling from the base station nor the D2DSS 307 broadcast by the first terminal device 301, but can receives the D2DSS 308 from the second terminal device 302, which allows the third terminal device 303 to synchronise to the second terminal device 302, which is in turn synchronised to the first terminal device, which is in turn synchronised to the base station 204. Thus, a process is provided by which the terminal devices can synchronise with one another. A similar approach can be adopted when all terminal devices are out of coverage, except the first terminal device will define the synchronisation to which the other terminal devices are synchronised, rather than receive the synchronisation from the network.

Whilst FIG. 3 represents one particular approach for achieving D2D synchronisation, it will be appreciated the specific processes for achieving D2D synchronisation (e.g. in terms of the specific nature of the synchronisation signalling and how it is configured among devices) is not fundamentally significant to the principles described herein. Rather, what is significant, and as discussed further below, is that a wireless telecommunications system supports multiple synchronisation procedures, with the specific processes associated with each of these procedures not being directly relevant.

Thus, in a wireless telecommunications system supporting D2D communications, different terminal devices may achieve their communication synchronisation from different sources. In some respects the types of synchronisation source can be categorised into two types. A first type is where the fundamental timing reference for synchronisation is derived from a network infrastructure element, such as a base station, and synchronisation signalling from this type of synchronisation source may sometimes be referred to as D2DSSue_net (the subscript "net" indicating a network derived timing). A second type is where the fundamental timing reference for synchronisation is not derived from a network infrastructure element, and synchronisation signalling from this type of synchronisation source may sometimes be referred to as D2DSSue_oon (the subscript "oon" indicating an out of network derived timing).

Thus, a terminal device may achieve synchronisation from a number of different sources and be configured to prioritise the different sources to use for synchronisation. For example, it has been proposed a terminal device will prioritise synchronisation sources in the following order.

1) The terminal device will first seek to achieve synchronisation using synchronisation signalling received directly from network infrastructure equipment (e.g. base station).
2) If the terminal device is not able to achieve synchronisation using synchronisation signalling received directly from network infrastructure equipment, the terminal device will next seek to achieve synchronisation using synchronisation signalling received from a terminal device which has achieved synchronisation using synchronisation signalling received directly from network infrastructure equipment (i.e. an in-coverage terminal device).
3) If the terminal device is not able to achieve synchronisation using synchronisation signalling received directly from network infrastructure equipment or from an in-coverage terminal device, the terminal device will next seek to achieve synchronisation using synchronisation signalling received from a terminal device which is out of network coverage (i.e. a terminal device which has not itself achieve synchronisation using the transaction signalling received directly from network infrastructure equipment).

The process of selecting a synchronisation source in accordance with a prioritised list of potential sources, for example as discussed above, may be referred to as synchronisation source selection.

The inventors have recognised an issue with existing processes for synchronisation source selection is the time taken to make the selection can give rise to delays which may be undesirable, for example in relation to high priority/urgent/emergency communications.

Figure 4:
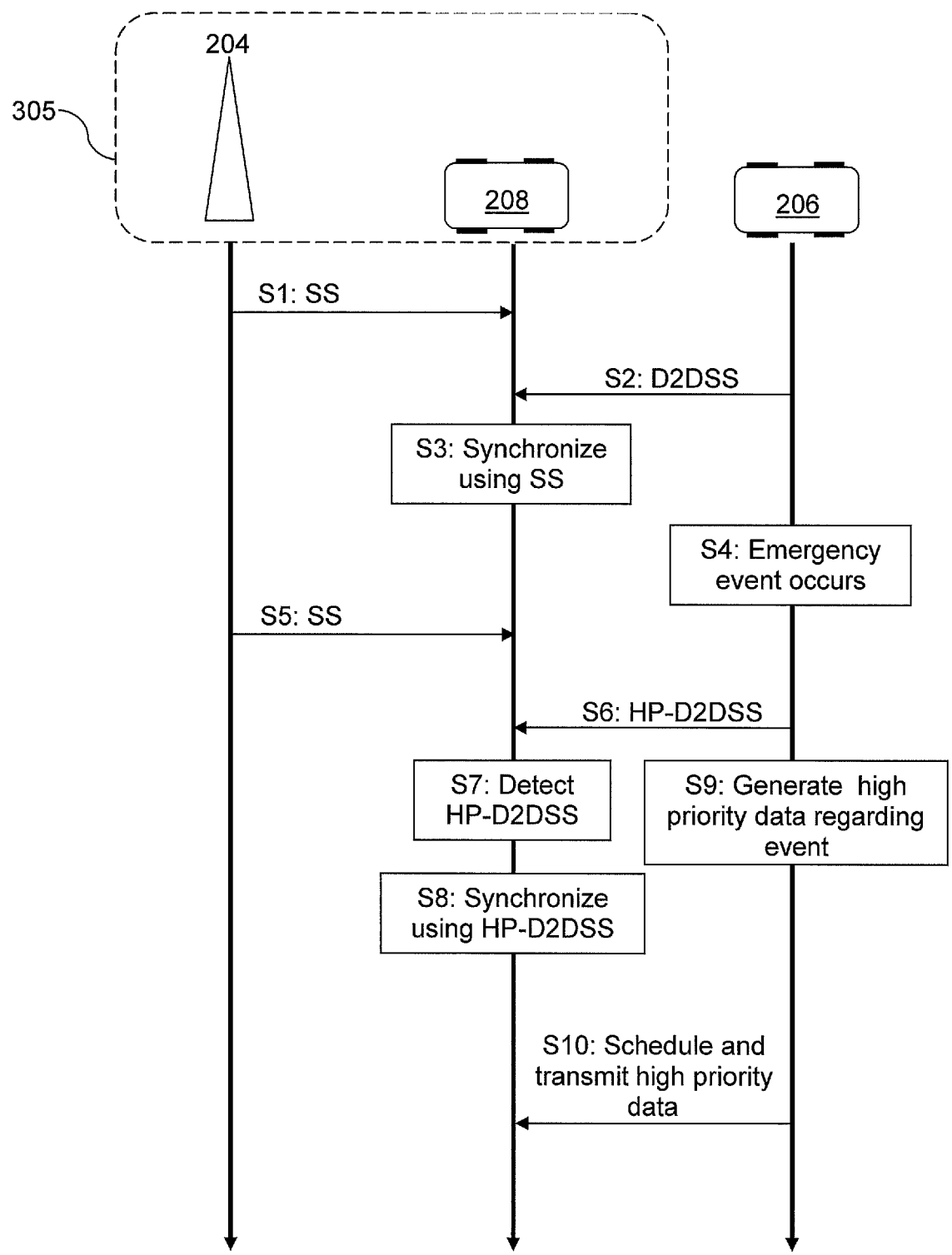
FIG. 4 is a ladder diagram schematically representing a mode of operation for a wireless telecommunications system in accordance with certain embodiments of the disclosure.

FIG. 4 is a ladder diagram schematically representing some modes of operation in a wireless telecommunications system according to certain embodiments of the disclosure. The figure schematically represents some operating aspects and signalling exchange for a base station 204, a first terminal device 206, and a second terminal device 208 of the kind discussed above with reference to FIG. 2. It is assumed for this example the first terminal device 206 is outside a coverage area 305 associated with the base station 204, whereas the second terminal device 208 is the coverage area (cell) 305 of the base station 204.

As schematically indicated in step S1, and in accordance with generally conventional techniques, the base station broadcasts synchronisation signalling (SS) on an ongoing basis. For example, in an LTE context, synchronisation signalling (e.g. PSS/SSS) is transmitted by the base station twice in every 10 ms frame.

As schematically indicated in step S2, the first terminal device 206 also transmits synchronisation signalling (D2DSS) to help maintain synchronisation amongst devices operable to communicate with the first terminal device in a device-to-device manner.

The second terminal device 208 is capable of achieving synchronisation using synchronisation signalling received from the base station 204 (i.e. the synchronisation signalling SS transmitted by the base station 204 in step S1) and using synchronisation signalling received from the first terminal device 206 (i.e. the synchronisation signalling D2DSS transmitted by the first terminal device 206 in step S2). However, as discussed above, the second terminal device 208 is configured during normal operation to preferentially seek to achieve synchronisation using synchronisation signalling transmitted by the base station over synchronisation signalling transmitted by the first terminal device. That is to say, the default position for the second terminal device 208 is to seek to achieve synchronisation using synchronisation signalling received from the base station before seeking to do so using signalling received from the first terminal device 206. This is schematically represented in FIG. 4 by step S3.

Thus, so long as the second terminal device 208 is correctly receiving synchronisation signalling from the base station 204, the second terminal device 208 will in accordance with previously proposed techniques rely on this synchronisation signalling to achieve synchronisation for its communications. However, in accordance with certain embodiments of the disclosure as discussed herein, the first terminal device 206 is able to in effect force the second terminal device 208 to seek to achieve synchronisation using synchronisation signalling transmitted by the first terminal device 206 in preference to synchronisation signalling transmitted by the base station 204. That is to say, in accordance with certain embodiments of the disclosure, a first terminal device (or other network entity) can control a second terminal device (or other network entity) to override its default synchronisation source prioritisation procedure, for example in order to more quickly establish communications in the event of an emergency situation arising.

In step S4 in FIG. 4, the first terminal device 206 detects that an emergency event has occurred. The nature of the emergency is not significant to the principles described herein. In the context of a vehicle-to-vehicle deployment, the emergency situation might, for example, correspond with the first terminal device determining that a vehicle with which the terminal device is associated has been involved in a crash or has undergone heavy braking. It will be appreciated the manner in which the occurrence of the emergency event is detected is not significant. For example, in practice it may be expected that a vehicle (or other host device) with which the first terminal device is associated will initially detect the occurrence of the emergency event from its own sensors, and provide an indication of this to the terminal device, for example over a communications interface connection between the terminal device and the vehicle (or other host device) with which it is associated.

As schematically indicated in step S5, throughout the operation represented in FIG. 4, the base station continues to transmit its synchronisation signalling (SS) in accordance with conventional techniques. That is to say, step S5 is indicative of an ongoing process and is not linked to the detection of the emergency event in step S4.

In step S6, in response to determining the emergency event has occurred in step S4, the first terminal device 206 determines that it should transmit emergency data relating to the event in a device-to-device manner. For example, in the case the emergency event is a crash of a vehicle supporting vehicle-to-vehicle communications, the first terminal device may determine that it should broadcast a warning message to indicate a crash has occurred at its location. This is with a view to providing surrounding vehicles, for example following vehicles, with information that may allow them to react to the occurrence of the emergency event in an appropriate way, for example by quickly coming to a stop.

To allow the first terminal device to establish communications with other terminal devices as quickly as possible in accordance with embodiments of the disclosure, in step S6 the first terminal device 206 transmits synchronisation signalling having a predefined characteristic which indicates the synchronisation signalling is high priority synchronisation signalling (HP-D2DSS). Apart from being associated with the predefined characteristic indicating the synchronisation signalling is high priority synchronisation signalling, the high priority synchronisation signalling may otherwise correspond with conventional D2D synchronisation signalling, for example of the kind transmitted by the first terminal device in step S2.

There are various characteristics that may be associated with the synchronisation signalling of step S6 to indicate the synchronisation signalling is high priority synchronisation signalling.

In this example the wireless telecommunications system is configured so the high priority synchronisation signalling HP-D2DSS is transmitted on radio resources (e.g. in terms of time and frequency resources) which are reserved for the purpose of transmitting high priority synchronisation signalling. The radio resources which are reserved for the purpose of transmitting high priority synchronisation signalling in accordance with this example approach may be defined/established in a number of ways. For example, an indication of the reserved radio resources may be defined in an operating standard of the wireless telecommunication system in which an embodiment of the disclosure is implemented. In another example an indication of the reserved radio resources may be received by a terminal device in signalling received from another entity operating in the wireless telecommunication system, e.g. a base station or other network infrastructure element or another terminal device, having selectable control over the choice of radio resources to be reserved for this purpose, for example in system information, SI, signalling or other control signalling. In yet another example an indication of the reserved radio resources may be defined by a Subscriber Identity Module, SIM, or subscription based configuration for terminal devices implementing an approach in accordance with the principles described herein in accordance with conventional approaches for establishing configuration settings in wireless telecommunications systems. It may be considered appropriate for some implementations for the reserved radio resources to be fixed and non-selectable within a given wireless telecommunication system (e.g. the reserved resources may be defined by standard) so the same resources can be used within different wireless telecommunication systems, for example systems associated with different mobile network operators, MNOs, to assist interoperability. It will be appreciated the reserved resources may be resources in a dedicated spectrum, such as for DSRC or a shared spectrum or the licensed spectrum of respective MNOs, or a combination thereof.

Thus, the first terminal device 206 may be configured to transmit its routine synchronisation signalling (e.g. as in step S2) using a first set of radio resources, for example, in terms of specific times and frequencies within a radio frame structure associated with device-to-device transmissions in the wireless telecommunications system, but may further be configured to transmit high priority synchronisation signalling (e.g. as in step S6) using a second, different, set of radio resources within the radio frame structure. Apart from the difference in radio resources used, the routine synchronisation signalling (as in step S2) and the emergency/high priority synchronisation signalling (as in step S6) might be the same, for example they may use the same types of synchronisation signal sequences/codes.

In another example, the wireless telecommunications system may be configured so the high priority synchronisation signalling HP-D2DSS is transmitted in association with an explicit indication, e.g. a data bit associated with the synchronisation signalling may be set to a predefined value to indicate the synchronisation signalling is high priority synchronisation signalling.

In yet another example, the wireless telecommunications system may be configured so the high priority synchronisation signalling HP-D2DSS is transmitted with a predefined format that indicates the synchronisation signalling is high priority. For example, the predefined format may correspond with a particular choice of synchronisation signalling sequence/code reserved for use by high priority synchronisation signalling.

Regardless of the manner by which synchronisation signalling is indicated as high priority synchronisation signalling, i.e. regardless of the nature of the predefined characteristic which is associated with the synchronisation signalling transmitted by the first terminal device 206 to indicate the synchronisation signalling is high priority synchronisation signalling, the other terminal devices operating in the wireless telecommunications system, for example the second terminal device 208 represented in FIG. 4, are configured in accordance with an embodiment of the disclosure to monitor for synchronisation signalling having/being associated with the predefined characteristic(s).

Thus, in this example in which it is assumed the predefined characteristic corresponds with using particular radio resources reserved for high priority synchronisation signalling, the second terminal device 208 is configured to monitor these radio resources on an ongoing basis to detect the presence of synchronisation signalling on these radio resources. The detection of synchronisation signalling on these resources by a terminal device thus corresponds with the detection of high priority synchronisation signalling.

As schematically indicated in step S7, the second terminal device detects the high priority synchronisation signalling (i.e. the second terminal device detects synchronisation signalling has been transmitted in association with the predefined characteristic which indicates the synchronisation signalling is high priority synchronisation signalling).

In step S8 the second terminal device seeks to synchronise to the high priority synchronisation signalling received in step S7. The underlying process of synchronisation may be performed in accordance with conventional techniques. One significant aspect of the operation of the second terminal device in this regard is that it seeks to synchronise to the synchronisation signalling received from the terminal device, rather than synchronisation signalling received from the base station, which is contrary to its default synchronisation procedure. That is to say, the second terminal device's default synchronisation procedure has been overridden by receiving the emergency/high priority signal data signalling from the first terminal device.

In step S9 the first terminal device 206 generates the high priority data regarding the event which it wishes to transmit. For example, in the case of the emergency event of step S4 corresponding to a crash, the high priority data may comprise an indication of the occurrence and location of the crash.

In step S10 the first terminal device 206 proceeds to schedule and transmit the high priority data generated step S9, for example in a broadcast device-to-device manner, for reception by the second terminal device 208. This may be performed in accordance with conventional techniques. However, in some cases, the resources to be used for transmitting the high priority may also be pre-defined, for example in terms of particular time and frequency resources within a device-to-device communications frame structure, thereby obviating the need for the first terminal device to separately schedule the transmissions, which can further help reduce delays between the detection of the emergency event and the transmission of the high priority data relating to the event.

Thus, in accordance with the process set out in FIG. 4, a first terminal device detecting the occurrence of an emergency situation and a corresponding desire to transmit data quickly to other terminal devices to provide them with information regarding the emergency situation can in effect force other terminal devices to synchronise to the first terminal device in preference to any other synchronisation signalling they are receiving, and regardless of a default synchronisation prioritisation procedure, thereby allowing the data to be data more transmitted quickly than if the first terminal device were required to first achieved synchronisation.

In some scenarios the first terminal device may not have achieved synchronisation with the other entities operating in the network at the time of the emergency event, for example because it is out of coverage of a base station, as schematically represented in FIG. 4. In accordance with the principles described herein, the first terminal device may nonetheless be configured to proceed to transmit high priority synchronisation signalling reflecting its current synchronisation, for example based on its most-recently achieved synchronisation or a self-created synchronisation. Significantly, the first terminal device may do this without going through a synchronisation source selection procedure (i.e. without first trying to achieve network synchronisation by trying to detect and decode synchronisation signalling received from a base station), thereby allowing the terminal device to proceed with transmitting data regarding the occurrence of the event more quickly than would otherwise be the case. That is to say, with reference to FIG. 4, prior to transmitting the high priority synchronisation signalling (HP-D2DSS) in step S6, the first terminal device 206 does not attempt to achieve synchronisation in accordance with its own default synchronisation source selection process.

In general it may be expected that emergency events occur rarely so there is a relatively small chance of a collision between high priority synchronisation signalling transmitted using the same predefined characteristics from two different terminal devices. However, one scenario in which a high priority synchronisation signalling collision may be considered more likely to occur is where a crash involves two (or more) vehicles which are respectively associated with terminal devices configured to operate in accordance with the principles described herein. In this scenario, different terminal devices associated with the different vehicles involved in the crash may simultaneously undertake the processing represented in FIG. 4, which may result in a signalling collision in respect of high priority synchronisation signalling from the respective terminal devices.

One way to help reduce the likelihood of this occurring would be for different terminal devices to wait for a selectable delay between detecting the emergency event has occurred and transmitting their high priority signals a signalling. This delay may be quasi-random, for example, the respective terminal devices may determine their respective delays from an identifier for the respective terminal devices. For example, the delay may be selected as a number of milliseconds corresponding to the last digit of the terminal device's respective identifiers. Another way would be for terminal devices to select the predefined characteristic indicating their synchronisation signalling is high priority synchronisation signalling from a plurality of potential predefined characteristics, for example from a plurality of potential radio resources, e.g. at different times. The selection of the predefined characteristic by a particular terminal device may be quasi-random, for example, the respective terminal devices may determine their respective predefined characteristics from an identifier for the respective terminal devices. For example, there may be five potential predefined characteristics (e.g. five different reservations of radio resources to use for high priority synchronisation signals), and a particular terminal device may select a particular predefined characteristic according to a remainder value obtained when dividing a numeric identifier for the terminal device by five.

Thus, the above described approaches can help avoid collisions by increasing the likelihood that one of the terminal devices will broadcast its emergency synchronisation signalling before the other (rather than at the same time). For example, suppose vehicle A associated with terminal device A crashes in to vehicle B associated with terminal device B. Further suppose that, in accordance with the principles described above, terminal device A happens to transmit its high priority synchronisation signalling before terminal device B. In addition to waiting to transmit its own synchronisation signalling, terminal device B may, like all other terminal devices, be monitoring for high priority synchronisation signalling from other terminal devices. On detecting the high priority synchronisation signalling from terminal device A, terminal device B may thus assume that all other terminal devices will synchronise using the high priority synchronisation signalling from terminal device A, and so terminal device B may do the same, and need not transmit its own high priority synchronisation signalling.

Although the examples described above have focused on the situation in which a first terminal is communicating with a second terminal device, it will be appreciated in general there may be further terminal devices performing corresponding processes to that represented in FIG. 4. Furthermore, it will be appreciated that the roles of the first and the second terminal devices in FIG. 4 could be reversed. That is to say, if it were the second terminal device that detected the occurrence of an emergency event, it may itself transmit high priority synchronisation signalling that is received by the first terminal device.

Figure 5:
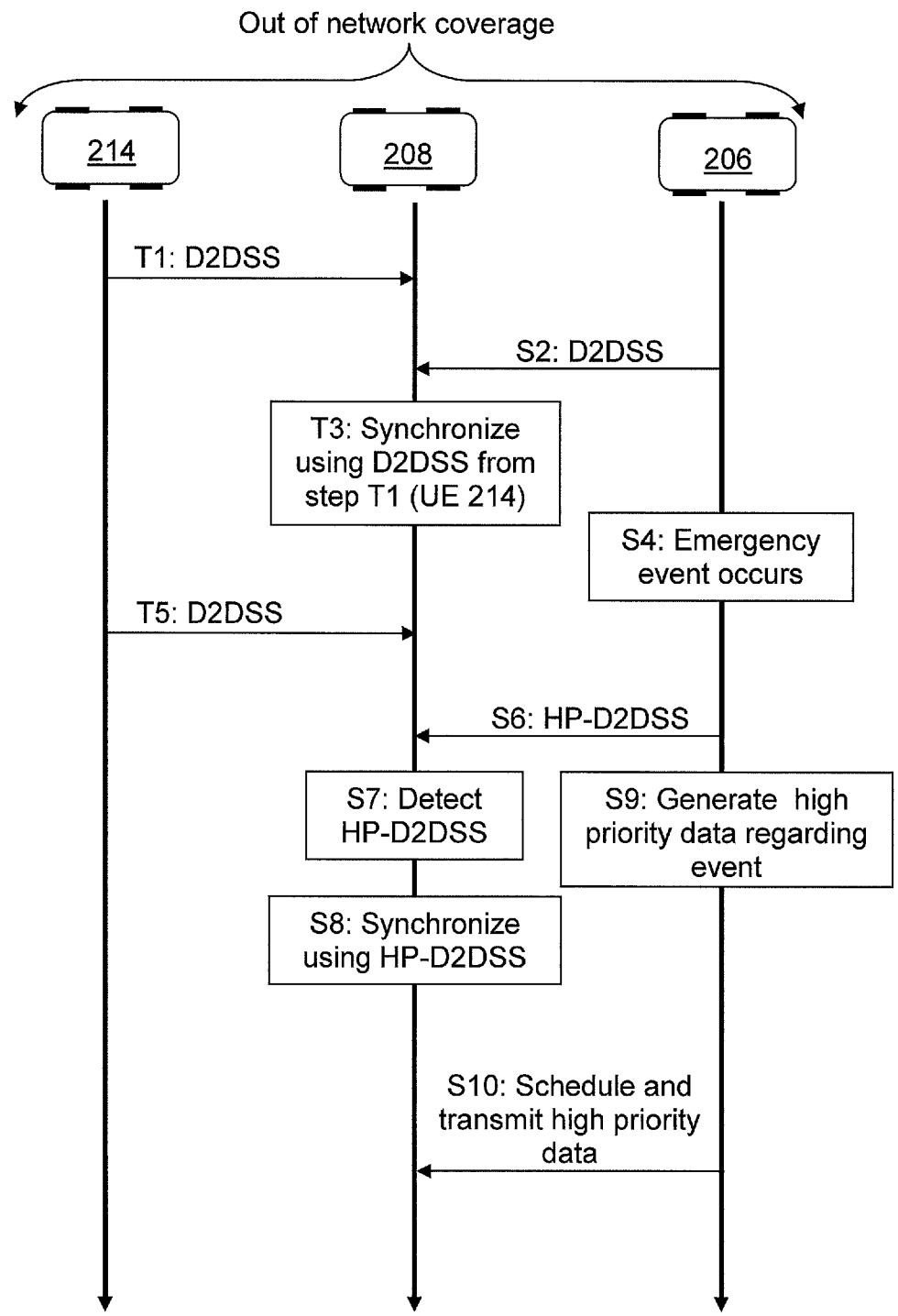
FIG. 5 is a ladder diagram schematically representing mode of operation for a wireless telecommunications system in accordance with certain other embodiments of the disclosure.

FIG. 5 is a ladder diagram schematically representing some modes of operation in a wireless telecommunications system according to certain embodiments of the disclosure. FIG. 5 is similar to, and will be understood from, FIG. 4. However, whereas FIG. 4 schematically represents a scenario in which the first terminal device 206 is in network coverage (i.e. within the coverage 305 of the base station 204) and the second terminal device 206 is out of network coverage (i.e. outside the coverage 305 of the base station 204), FIG. 5 schematically represents a scenario in which the first terminal device 206 and the second terminal device, as well as a third terminal device 2014, are involved in D2D communications while all are out of network coverage.

Step S2, S4 and S6 to S10 in the example of FIG. 5 correspond directly with the correspondingly numbered steps in FIG. 4 and are not described again in the interest of brevity. However, steps S1, S3 and S5 in FIG. 4 (i.e. the steps associated with the synchronisation signalling SS received from the base station) are not present in FIG. 5 (because the second terminal device 206 is assumed to be out of coverage in FIG. 5). Instead, the scenario of FIG. 5 reflects a situation on which there is another terminal device (i.e. the third terminal device 214) which is in D2D communication range of the second terminal device and transmitting its own D2D synchronisation signalling.

Thus in step T1 (which broadly corresponds with step S1 in FIG. 4 except in terms of the entity making the transmission), and in accordance with previously proposed techniques for D2D synchronisation procedures, e.g. as described in ETSI TS 136 331 v12.7.0 (2015-09)/3GPP TS 36.331 version 12.7.0 Release 12 [2], the third terminal device 214 broadcasts D2D synchronisation signalling (D2DSS) on an ongoing basis.

As schematically indicated in FIG. 5 step S2, the first terminal device 206 also transmits synchronisation signalling (D2DSS) to help maintain synchronisation amongst devices operable to communicate with the first terminal device in a device-to-device manner. This step corresponds with, and will be understood from, step S2 in FIG. 4 discussed above.

It is assumed here that for the second terminal device 208, the third terminal device 214 is a more preferred synchronisation source than the first terminal device 206 according to the relevant synchronisation source selection procedures. This may be, for example, because the third terminal device 214 has achieved synchronisation using signalling from a terminal device which is itself in network coverage (not shown in FIG. 5), whereas the first terminal device 206 has not.

The second terminal device 208 is capable of achieving synchronisation using synchronisation signalling received from the third terminal device 214 (i.e. the synchronisation signalling D2DSS transmitted by the third terminal device 214 in step T1) and using synchronisation signalling received from the first terminal device 206 (i.e. the synchronisation signalling D2DSS transmitted by the first terminal device 206 in step S2). However, as discussed above, it is assumed for the scenario represented in FIG. 5 that for the second terminal device 208, the third terminal device 214 is a more preferred synchronisation source than the first terminal device 206. That is to say, the current default position for the second terminal device 208 is to seek to achieve synchronisation using synchronisation signalling received from the third terminal device 214 before seeking to do so using signalling received from the first terminal device 206. This is schematically represented in FIG. 5 by step T3.

Thus, so long as the second terminal device 208 is correctly receiving synchronisation signalling from the third terminal device 214, the second terminal device 208 will in accordance with previously proposed techniques rely on this synchronisation signalling to achieve synchronisation for its communications. However, in accordance with certain embodiments of the disclosure as discussed herein, and in a manner similar to that described above with reference to FIG. 4, the first terminal device 206 is able to in effect force the second terminal device 208 to seek to achieve synchronisation using synchronisation signalling transmitted by the first terminal device 206 in preference to synchronisation signalling transmitted by the third terminal device 214.

In step S4 of FIG. 5, the first terminal device 206 detects that an emergency event has occurred. This step corresponds with, and will be understood from, step S4 in FIG. 4 discussed above.

As schematically indicated in step T5, throughout the operation represented in FIG. 5, the third terminal device 214 continues to transmit its synchronisation signalling (D2DSS) in accordance with conventional techniques. That is to say, step S5 is indicative of an ongoing process and is not linked to the detection of the emergency event in step S4.

In step S6 of FIG. 5, in response to determining the emergency event has occurred in step S4, the first terminal device 206 determines that it should transmit emergency data relating to the event in a device-to-device manner. This step corresponds with, and will be understood from, step S6 in FIG. 4.

As schematically indicated in step S7 of FIG. 5, the second terminal device detects the high priority synchronisation signalling (i.e. the second terminal device detects synchronisation signalling has been transmitted in association with the predefined characteristic which indicates the synchronisation signalling is high priority synchronisation signalling). This step corresponds with, and will be understood from, step S7 in FIG. 4 discussed above.

In step S8 of FIG. 5 the second terminal device seeks to synchronise to the high priority synchronisation signalling received in step S7. This step corresponds with, and will be understood from, step S8 in FIG. 4 discussed above.

In step S9 of FIG. 5 the first terminal device 206 generates the high priority data regarding the event which it wishes to transmit. This step corresponds with, and will be understood from, step S9 in FIG. 4 discussed above.

In step S10 of FIG. 5 the first terminal device 206 proceeds to schedule and transmit the high priority data generated step S9. This step corresponds with, and will be understood from, step S9 in FIG. 4 discussed above.

It will be appreciated the specific information content of a high priority communication associated with high priority synchronisation signalling between vehicles is not significant to the principles underlying the operations described herein. Thus in any given case the information content will depend on the implementation at hand and the functionality the particular ITS scheme provides. For example, in some implementations the information exchanged through the vehicle-to-vehicle communications may comprise information regarding the occurrence of a road traffic accident, warnings relating to road conditions, for example a detected high risk of skidding, or information regarding relatively unusual aspect of a vehicle's operation, for example sudden heavy braking. What is significant in accordance with the principles described herein, is the manner in which communications may be undertaken more swiftly than existing schemes, and not the information content of the communications themselves or the trigger events giving rise to the communications.

It will be appreciated that while some of the above-described embodiments have focused on examples in which a base station of the wireless telecommunications system is providing functionality in accordance with the principles described herein, in other implementations similar functionality may be provided by other components of the wireless telecommunications network infrastructure. For example, some, or all, of the processing described above in relation to the base station may be provided by a core network component of the wireless telecommunications system and/or similar functionality may be provided by other infrastructure elements, such as relay nodes and/or dedicated units for supporting an ITS scheme, for example roadside units (RSUs) deployed in association with a road network to facilitate vehicle-to-vehicle communications in accordance with previously proposed schemes. In this regard a base station may be considered as one example of network infrastructure equipment and may be configured to provide functionality of the kind described herein.

Thus there has been described a wireless telecommunications system comprising a first terminal device and a second terminal device operable to communicate with one another in a synchronised device-to-device manner. The second terminal device is operable to selectively achieve synchronisation for receiving data transmissions from the first terminal device using synchronisation signalling transmitted by the first terminal device (direct synchronisation) or synchronisation signalling transmitted by another network entity, such as a base station (indirect synchronisation). The second terminal device is configured to preferentially seek to achieve indirect synchronisation over direct synchronisation, unless the second terminal device detects synchronisation signalling transmitted by the first terminal device is associated with a predefined characteristic which indicates the synchronisation signalling transmitted by the first terminal device is high priority synchronisation signalling, in which case the second terminal device is configured to preferentially seek to achieve synchronisation using the high priority direct synchronisation signalling from the first terminal device over indirect synchronisation signalling transmitted by the other network entity. This can help the second terminal device achieve synchronisation for receiving data transmissions from the first terminal device more quickly in a high priority situation.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

1. A wireless telecommunications system comprising a first terminal device and a second terminal device operable to communicate with one another in a synchronised device-to-device manner, wherein the second terminal device is operable to selectively achieve synchronisation for communicating with the first terminal device using synchronisation signalling transmitted by the first terminal device or synchronisation signalling transmitted by another network entity operating in the wireless telecommunications system, wherein the second terminal device is configured to preferentially seek to achieve synchronisation using synchronisation signalling transmitted by the other network entity over synchronisation signalling transmitted by the first terminal device, unless the second terminal device detects synchronisation signalling transmitted by the first terminal device is associated with a predefined characteristic which indicates the synchronisation signalling transmitted by the first terminal device is high priority synchronisation signalling, in which case the second terminal device is configured to preferentially seek to achieve synchronisation using synchronisation signalling transmitted by the first terminal device over synchronisation signalling transmitted by the other network entity.

2. The wireless telecommunications system of paragraph 1, wherein the predefined characteristic which indicates the synchronisation signalling is high priority synchronisation signalling is the use of predefined radio resources for transmitting the synchronisation signalling.

3. The wireless telecommunications system of paragraph 2, wherein the predefined radio resources are defined by an operating standard of the wireless telecommunication system and/or the first and/or second terminal devices are operation to receive an indication of the predefined radio resources from configuration signalling received from another entity operating in the wireless telecommunication system and/or from a Subscriber Identity Module, SIM, configuration setting and/or from a subscription-based configuration setting.

4. The wireless telecommunications system of any one of paragraphs 1 to 3, wherein the predefined characteristic which indicates the synchronisation signalling is high priority synchronisation signalling is the presence of a predefined indicator flag transmitted in association with the synchronisation signalling.

5. The wireless telecommunications system of any one of paragraphs 1 to 4, wherein the predefined characteristic which indicates the synchronisation signalling is high priority synchronisation signalling is the use of predefined format for the synchronisation signalling.

6. The wireless telecommunications system of any one of paragraphs 1 to 5, wherein the first terminal device is configured to transmit high priority synchronisation signalling on determining an event has occurred in response to which the first terminal device is configured to transmit high priority data relating to the event in a device-to-device manner.

7. The wireless telecommunications system of paragraph 6, wherein the first terminal device is configured to transmit the high priority synchronisation signalling without first seeking to synchronised to another network entity.

8. The wireless telecommunications system of paragraph 6 or 7, wherein the first terminal device is further configured to transmit the high priority data relating to the event.

9. The wireless telecommunications system of paragraph 8, wherein the high priority data relating to the event is transmitted by the first terminal in a device-to-device broadcast manner.

10. The wireless telecommunications system of paragraph 8 or 9, wherein the first terminal device is configured to wait for a selectable delay before transmitting the high priority synchronisation signalling after detecting the event has occurred for a selectable delay and/or wherein the first terminal device is configured to select the predefined characteristic for transmitting the high priority synchronisation signalling from a plurality of predefined characteristics.

11. The wireless telecommunications system of paragraph 10, wherein the first terminal device is configured to select the delay and/or the predefined characteristic in a quasi-random manner.

12. The wireless telecommunications system of paragraph 11, wherein the first terminal device is configured to select the delay and/or the predefined characteristic by taking account of a terminal device identifier associated with the first terminal device.

13. The wireless telecommunications system of any one of paragraphs 1 to 12, wherein the second terminal device is configured to monitor for synchronisation signalling transmitted with the predefined characteristic on an ongoing basis.

14. The wireless telecommunications system of any one of paragraphs 1 to 13, wherein the first terminal device is operable to selectively achieve synchronisation for communicating with the second terminal device using synchronisation signalling transmitted by the second terminal device or synchronisation signalling transmitted by the other network entity, wherein the first terminal device is configured to preferentially seek to achieve synchronisation using synchronisation signalling transmitted by the other network entity over synchronisation signalling transmitted by the second terminal device, unless the first terminal device detects synchronisation signalling transmitted by the second terminal device is associated with a predefined characteristic which indicates the synchronisation signalling transmitted by the second terminal device is high priority synchronisation signalling, in which case the first terminal device is configured to preferentially seek to achieve synchronisation using synchronisation signalling transmitted by the second terminal device over synchronisation signalling transmitted by the other network entity 15. The wireless telecommunications system of any one of paragraphs 1 to 14, wherein the wireless telecommunications system further comprises one or more further terminal devices operable to communicate with the second terminal device in a synchronised device-to-device manner, wherein the second terminal device is operable to selectively achieve synchronisation for receiving data from one of the further terminal devices using synchronisation signalling transmitted by the one of the further terminal devices or synchronisation signalling transmitted by another network entity operating in the wireless telecommunications system, wherein the second terminal device is configured to preferentially seek to achieve synchronisation using synchronisation signalling transmitted by the other network entity over synchronisation signalling transmitted by the one of the further terminal devices, unless the second terminal device detects synchronisation signalling transmitted by the one of the further terminal devices is associated with a predefined characteristic which indicates the synchronisation signalling is high priority synchronisation signalling, in which case the second terminal device is configured to preferentially seek to achieve synchronisation using the high priority synchronisation signalling over synchronisation signalling transmitted by the other network entity.

16. The wireless telecommunications system of any one of paragraphs 1 to 15, wherein the other network entity comprises network infrastructure equipment or wherein the other network entity comprises another terminal device operating in the wireless telecommunications system.

17. A method of operating a wireless telecommunications system comprising a first terminal device and a second terminal device operable to communicate with one another in a synchronised device-to-device manner, wherein the second terminal device is operable to selectively achieve synchronisation for communicating with the first terminal device using synchronisation signalling transmitted by the first terminal device or synchronisation signalling transmitted by another network entity operating in the wireless telecommunications system, wherein the method comprises the second terminal device preferentially seeking to achieve synchronisation using synchronisation signalling transmitted by the other network entity over synchronisation signalling transmitted by the first terminal device, unless the second terminal device detects synchronisation signalling transmitted by the first terminal device is associated with a predefined characteristic which indicates the synchronisation signalling transmitted by the first terminal device is high priority synchronisation signalling, in which case the second terminal device preferentially seeks to achieve synchronisation using the high priority synchronisation signalling rather than synchronisation signalling transmitted by the other network entity.

18. A first terminal device for use in a wireless telecommunications system comprising the first terminal device and a second terminal device, wherein the first terminal device comprises a controller unit and a transceiver unit configured such that the first terminal device is operable to transmit data to the second terminal device in a synchronised device-to-device manner, wherein the second terminal device is operable to achieve synchronisation for receiving data from the first terminal device using synchronisation signalling transmitted by the first terminal device or synchronisation signalling transmitted by another network entity operating in the wireless telecommunications system, wherein the first terminal device is configured to selectively transmit synchronisation signalling with a predefined characteristic to indicate the synchronisation signalling transmitted by the first terminal device is high priority synchronisation signalling and the second terminal device should seek to achieve synchronisation with the first terminal device using the high priority synchronisation signalling rather than synchronisation signalling transmitted by the other network entity.

19. A method of operating a first terminal device in a wireless telecommunications system comprising the first terminal device and a second terminal device, wherein the first terminal device is operable to transmit data to the second terminal device in a synchronised device-to-device manner and the second terminal device is operable to achieve synchronisation for receiving data from the first terminal device using synchronisation signalling transmitted by the first terminal device or synchronisation signalling transmitted by another network entity operating in the wireless telecommunications system, wherein the method comprises the first terminal device selectively transmitting synchronisation signalling with a predefined characteristic to indicate the synchronisation signalling transmitted by the first terminal device is high priority synchronisation signalling and the second terminal device should seek to achieve synchronisation with the first terminal device using the high priority synchronisation signalling rather than synchronisation signalling transmitted by the other network entity.

20. Integrated circuitry for a first terminal device for use in a wireless telecommunications system comprising the first terminal device and a second terminal device, wherein the integrated circuitry comprises a controller element and a transceiver element configured to operate together such that the first terminal device is operable to transmit data to the second terminal device in a synchronised device-to-device manner, wherein the second terminal device is operable to achieve synchronisation for receiving data from the first terminal device using synchronisation signalling transmitted by the first terminal device or synchronisation signalling transmitted by another network entity operating in the wireless telecommunications system, wherein the first terminal device is configured to selectively transmit synchronisation signalling with a predefined characteristic to indicate the synchronisation signalling transmitted by the first terminal device is high priority synchronisation signalling and the second terminal device should seek to achieve synchronisation with the first terminal device using the high priority synchronisation signalling rather than synchronisation signalling transmitted by the other network entity.

21. A second terminal device for use in a wireless telecommunications system comprising a first terminal device and the second terminal device, wherein the second terminal device comprises a controller unit and a transceiver unit configured such that the second terminal device is operable to receive data from the first terminal device in a synchronised device-to-device manner, and wherein the second terminal device is operable to selectively achieve synchronisation for receiving data from the first terminal device using synchronisation signalling received from the first terminal device or synchronisation signalling received from another network entity operating in the wireless telecommunications system, wherein the second terminal device is configured to preferentially seek to achieve synchronisation using synchronisation signalling received from the other network entity over synchronisation signalling received from the first terminal device, unless the second terminal device detects synchronisation signalling received from the first terminal device is associated with a predefined characteristic which indicates the synchronisation signalling received from the first terminal device is high priority synchronisation signalling, in which case the second terminal device is configured to seek to achieve synchronisation using the high priority synchronisation signalling received from the first terminal device rather than synchronisation signalling received from the other network entity.

22. A method of operating a second terminal device in a wireless telecommunications system comprising a first terminal device and the second terminal device, wherein the second terminal device is operable to receive data from the first terminal device in a synchronised device-to-device manner, wherein the second terminal device is operable to selectively achieve synchronisation for receiving data from the first terminal device using synchronisation signalling received from the first terminal device or synchronisation signalling received from another network entity operating in the wireless telecommunications system, wherein the second terminal device is configured to preferentially seek to achieve synchronisation using synchronisation signalling received from the other network entity over synchronisation signalling received from the first terminal device, unless the second terminal device detects synchronisation signalling received from the first terminal device is associated with a predefined characteristic which indicates the synchronisation signalling received from the first terminal device is high priority synchronisation signalling, wherein the method comprises the second terminal device detecting synchronisation signalling received from the first terminal device in association with the predefined characteristic indicating the synchronisation signalling is high priority synchronisation signalling, and in response thereto, seeking to achieve synchronisation using the high priority synchronisation signalling received from the first terminal device in preference to synchronisation signalling received from the other network entity.

23. Integrated circuitry for a second terminal device for use in a wireless telecommunications system comprising a first terminal device and the second terminal device, wherein the integrated circuitry comprises a controller element and a transceiver element configured to operate together such that the second terminal device is operable to receive data from the first terminal device in a synchronised device-to-device manner, wherein the second terminal device is operable to selectively achieve synchronisation for receiving data from the first terminal device using synchronisation signalling received from the first terminal device or synchronisation signalling received from another network entity operating in the wireless telecommunications system, wherein the second terminal device is configured to preferentially seek to achieve synchronisation using synchronisation signalling received from the other network entity over synchronisation signalling received from the first terminal device, unless the second terminal device detects synchronisation signalling received from the first terminal device is associated with a predefined characteristic which indicates the synchronisation signalling received from the first terminal device is high priority synchronisation signalling, wherein the method comprises the second terminal device detecting synchronisation signalling received from the first terminal device in association with the predefined characteristic indicating the synchronisation signalling is high priority synchronisation signalling, and in response thereto, seeking to achieve synchronisation using the high priority synchronisation signalling received from the first terminal device in preference to synchronisation signalling received from the other network entity.

REFERENCES

[1] Holma H. and Toskala A., "LTE for UMTS OFDMA and SC-FDMA based radio access", John Wiley and Sons, 2009
[2] ETSI TS 136 331 v12.7.0 (2015-09)/3GPP TS 36.331 version 12.7.0 Release 12

What is claimed is:

1. A wireless telecommunications system comprising:
a first terminal device and a second terminal device operable to communicate with one another in a synchronised device-to-device manner,
wherein the second terminal device is operable to selectively achieve synchronisation for communicating with the first terminal device using synchronisation signalling transmitted by the first terminal device or synchronisation signalling transmitted by another network entity operating in the wireless telecommunications system,
wherein the second terminal device is configured to preferentially seek to achieve synchronisation using synchronisation signalling transmitted by the other network entity over synchronisation signalling transmitted by the first terminal device, unless the second terminal device detects synchronisation signalling transmitted by the first terminal device that is associated with a predefined characteristic which indicates that the synchronisation signalling transmitted by the first terminal device is high priority synchronisation signalling, in which case the second terminal device is configured to preferentially seek to achieve synchronisation using synchronisation signalling transmitted by the first terminal device over synchronisation signalling transmitted by the other network entity.

2. The wireless telecommunications system of claim 1, wherein the predefined characteristic which indicates the synchronisation signalling is high priority synchronisation signalling is the use of predefined radio resources for transmitting the synchronisation signalling.

3. The wireless telecommunications system of claim 2, wherein the predefined radio resources are defined by an operating standard of the wireless telecommunication system and the first and second terminal devices are operable to receive an indication of the predefined radio resources from configuration signalling received from another entity operating in the wireless telecommunication system and from a Subscriber Identity Module (SIM) configuration setting and from a subscription-based configuration setting.

4. The wireless telecommunications system of claim 1, wherein the predefined characteristic which indicates the synchronisation signalling is high priority synchronisation signalling is the presence of a predefined indicator flag transmitted in association with the synchronisation signalling.

5. The wireless telecommunications system of claim 1, wherein the predefined characteristic which indicates the synchronisation signalling is high priority synchronisation signalling is the use of predefined format for the synchronisation signalling.

6. The wireless telecommunications system of claim 1, wherein the first terminal device is configured to transmit high priority synchronisation signalling on determining an event has occurred in response to which the first terminal device is configured to transmit high priority data relating to the event in a device-to-device manner.

7. The wireless telecommunications system of claim 6, wherein the first terminal device is configured to transmit the high priority synchronisation signalling without first seeking to synchronise to another network entity.

8. The wireless telecommunications system of claim 6, wherein the first terminal device is further configured to transmit the high priority data relating to the event.

9. The wireless telecommunications system of claim 8, wherein the high priority data relating to the event is transmitted by the first terminal in a device-to-device broadcast manner.

10. The wireless telecommunications system of claim 8, wherein the first terminal device is configured to wait for a selectable delay before transmitting the high priority synchronisation signalling after detecting the event has occurred for a selectable delay or wherein the first terminal device is configured to select the predefined characteristic for transmitting the high priority synchronisation signalling from a plurality of predefined characteristics.

11. The wireless telecommunications system of claim 10, wherein the first terminal device is configured to select the delay or the predefined characteristic in a quasi-random manner.

12. The wireless telecommunications system of claim 11, wherein the first terminal device is configured to select the delay or the predefined characteristic by taking account of a terminal device identifier associated with the first terminal device.

13. The wireless telecommunications system of claim 1, wherein the second terminal device is configured to monitor for synchronisation signalling transmitted with the predefined characteristic on an ongoing basis.

14. The wireless telecommunications system of claim 1, wherein the first terminal device is operable to selectively achieve synchronisation for communicating with the second terminal device using synchronisation signalling transmitted by the second terminal device or synchronisation signalling transmitted by the other network entity, wherein the first terminal device is configured to preferentially seek to achieve synchronisation using synchronisation signalling transmitted by the other network entity over synchronisation signalling transmitted by the second terminal device, unless the first terminal device detects synchronisation signalling transmitted by the second terminal device is associated with a predefined characteristic which indicates the synchronisation signalling transmitted by the second terminal device is high priority synchronisation signalling, in which case the first terminal device is configured to preferentially seek to achieve synchronisation using synchronisation signalling transmitted by the second terminal device over synchronisation signalling transmitted by the other network entity.

15. The wireless telecommunications system of claim 1, wherein the wireless telecommunications system further comprises one or more further terminal devices operable to communicate with the second terminal device in a synchronised device-to-device manner, wherein the second terminal device is operable to selectively achieve synchronisation for receiving data from one of the further terminal devices using synchronisation signalling transmitted by the one of the further terminal devices or synchronisation signalling transmitted by another network entity operating in the wireless telecommunications system, wherein the second terminal device is configured to preferentially seek to achieve synchronisation using synchronisation signalling transmitted by the other network entity over synchronisation signalling transmitted by the one of the further terminal devices, unless the second terminal device detects synchronisation signalling transmitted by the one of the further terminal devices is associated with a predefined characteristic which indicates the synchronisation signalling is high priority synchronisation signalling, in which case the second terminal device is configured to preferentially seek to achieve synchronisation using the high priority synchronisation signalling over synchronisation signalling transmitted by the other network entity.

16. The wireless telecommunications system of claim 1, wherein the other network entity comprises network infrastructure equipment or wherein the other network entity comprises another terminal device operating in the wireless telecommunications system.

17. A method of operating a wireless telecommunications system comprising:
a first terminal device and a second terminal device operable to communicate with one another in a synchronised device-to-device manner,
wherein the second terminal device is operable to selectively achieve synchronisation for communicating with the first terminal device using synchronisation signalling transmitted by the first terminal device or synchronisation signalling transmitted by another network entity operating in the wireless telecommunications system,
wherein the method comprises the second terminal device preferentially seeking to achieve synchronisation using synchronisation signalling transmitted by the other network entity over synchronisation signalling transmitted by the first terminal device, unless the second terminal device detects synchronisation signalling transmitted by the first terminal device that is associated with a predefined characteristic which indicates that the synchronisation signalling transmitted by the first terminal device is high priority synchronisation signalling, in which case the second terminal device preferentially seeks to achieve synchronisation using the high priority synchronisation signalling rather than synchronisation signalling transmitted by the other network entity.

18. A first terminal device for use in a wireless telecommunications system comprising:
the first terminal device and a second terminal device,
wherein the first terminal device comprises a controller and a transceiver configured such that the first terminal device is operable to transmit data to the second terminal device in a synchronised device-to-device manner,
wherein the second terminal device is operable to achieve synchronisation for receiving data from the first terminal device using synchronisation signalling transmitted by the first terminal device or synchronisation signalling transmitted by a base station operating in the wireless telecommunications system,
wherein the first terminal device is configured to selectively transmit synchronisation signalling with a predefined characteristic to indicate that the synchronisation signalling transmitted by the first terminal device is high priority synchronisation signalling and the second terminal device seeks to achieve synchronisation with the first terminal device using the high priority synchronisation signalling rather than synchronisation signalling transmitted by the base station.

19. A method of operating a first terminal device in a wireless telecommunications system comprising:
the first terminal device and a second terminal device,
wherein the first terminal device is operable to transmit data to the second terminal device in a synchronised device-to-device manner and the second terminal device is operable to achieve synchronisation for receiving data from the first terminal device using synchronisation signalling transmitted by the first terminal device or synchronisation signalling transmitted by a base station operating in the wireless telecommunications system,
wherein the method comprises the first terminal device selectively transmitting synchronisation signalling with a predefined characteristic to indicate that the synchronisation signalling transmitted by the first terminal device is high priority synchronisation signalling and the second terminal device seeks to achieve synchronisation with the first terminal device using the high priority synchronisation signalling rather than synchronisation signalling transmitted by the base station.

20. A method of operating a second terminal device in a wireless telecommunications system comprising:
a first terminal device and the second terminal device,
wherein the second terminal device is operable to receive data from the first terminal device in a synchronised device-to-device manner,
wherein the second terminal device is operable to selectively achieve synchronisation for receiving data from the first terminal device using synchronisation signalling received from the first terminal device or synchronisation signalling received from another network entity operating in the wireless telecommunications system,
wherein the second terminal device is configured to preferentially seek to achieve synchronisation using synchronisation signalling received from the other network entity over synchronisation signalling received from the first terminal device, unless the second terminal device detects synchronisation signalling received from the first terminal device that is associated with a predefined characteristic which indicates that the synchronisation signalling received from the first terminal device is high priority synchronisation signalling,
wherein the method comprises the second terminal device detecting synchronisation signalling received from the first terminal device in association with the predefined characteristic indicating that the synchronisation signalling is high priority synchronisation signalling, and in response thereto, seeking to achieve synchronisation using the high priority synchronisation signalling received from the first terminal device in preference to synchronisation signalling received from the other network entity.

21. The wireless telecommunications system of claim 1, wherein the other network entity is a base station.

* * * * *